United States Patent [19]
Karlson

[11] 3,751,225
[45] Aug. 7, 1973

[54] STERILIZING WITH LIQUID SPRAY CONTAINING OZONE
[75] Inventor: Eskil L. Karlson, Stamford, Conn.
[73] Assignee: Pollution Control Industries Inc., Stamford, Conn.
[22] Filed: Mar. 2, 1970
[21] Appl. No.: 15,551

[52] U.S. Cl............ 21/91, 21/58, 21/74 A, 21/102 R, 21/123
[51] Int. Cl.............................. A61l 3/00
[58] Field of Search.............. 21/74, 74 A, 53, 21/54, 58, 77, 102, 103, 122–126; 210/63; 23/222; 204/176, 313

[56] References Cited
UNITED STATES PATENTS

| | | | |
|---|---|---|---|
| 680,812 | 8/1901 | Sheridan | 21/77 UX |
| 1,096,991 | 5/1914 | Blanchard | 21/74.1 UX |
| 2,043,217 | 6/1936 | Yaglou | 204/176 X |
| 2,095,651 | 10/1937 | Ronzi | 204/313 X |
| 2,248,713 | 7/1941 | Locke | 21/54 UX |
| 3,547,578 | 12/1970 | Eppler | 21/102 X |

FOREIGN PATENTS OR APPLICATIONS

| | | | |
|---|---|---|---|
| 321,846 | 11/1929 | Great Britain | 204/176 |
| 440,865 | 1/1936 | Great Britain | 21/74 |
| 185,731 | 1/1958 | Netherlands | 204/176 |

OTHER PUBLICATIONS
Lange's Handbook of Chemistry, 9th Ed., 1956, p. 94

Primary Examiner—Morris O. Wolk
Assistant Examiner—D. G. Millman
Attorney—John W. Hoag

[57] ABSTRACT

Ozone carrying mist is employed to sterilize the interior of an enclosure including surfaces and objects therein. Closing movement of a movable wall portion of the enclosure actuates timing means and provides substantially simultaneous flows of predetermined amounts of ozone and water which are mixed to form a mist and injected into the enclosure. Electrical circuitry controlled by the timing means then actuates means for exhausting ozone from the enclosure and drying the wetted surfaces therein.

1 Claim, 5 Drawing Figures

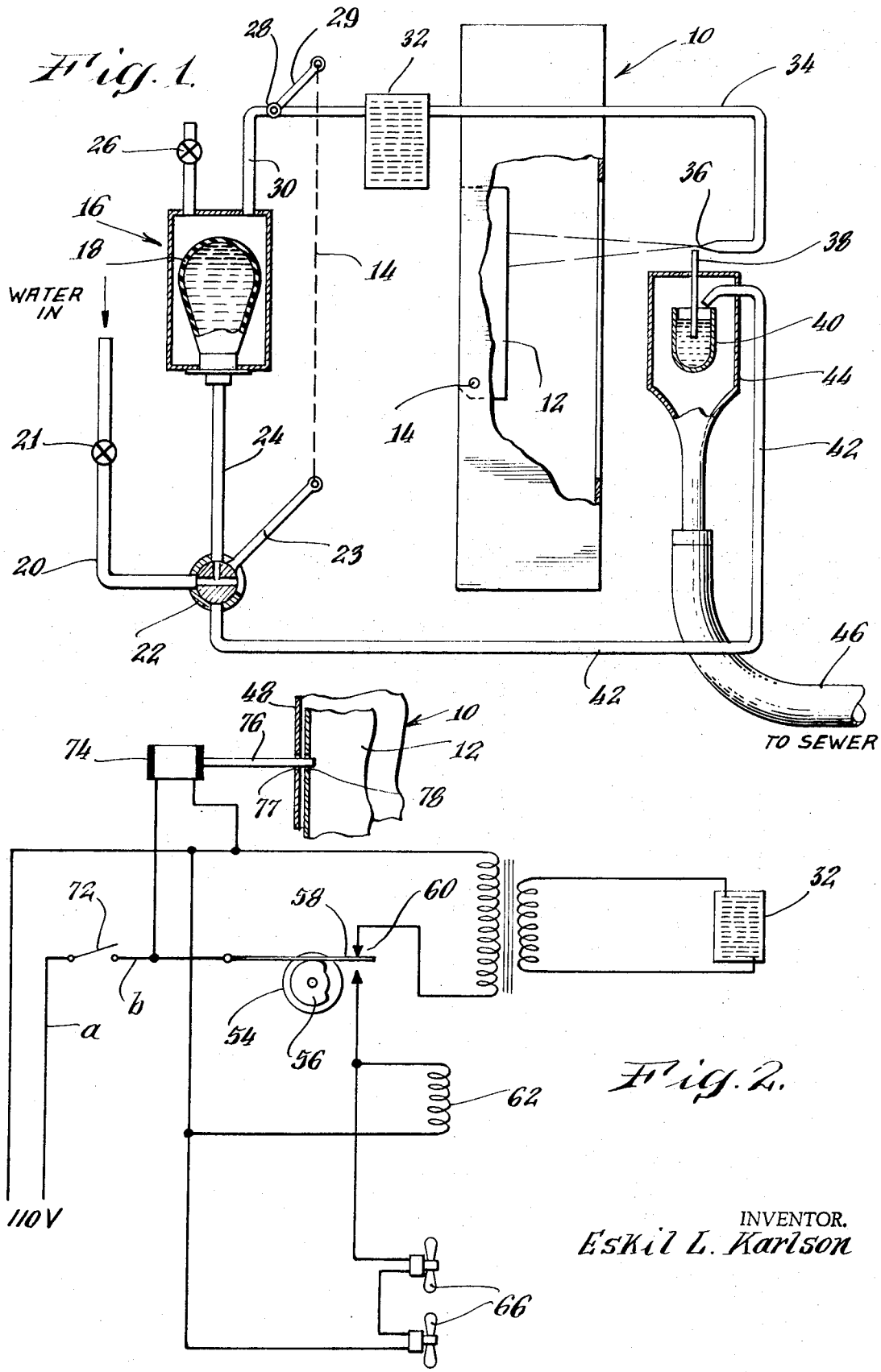

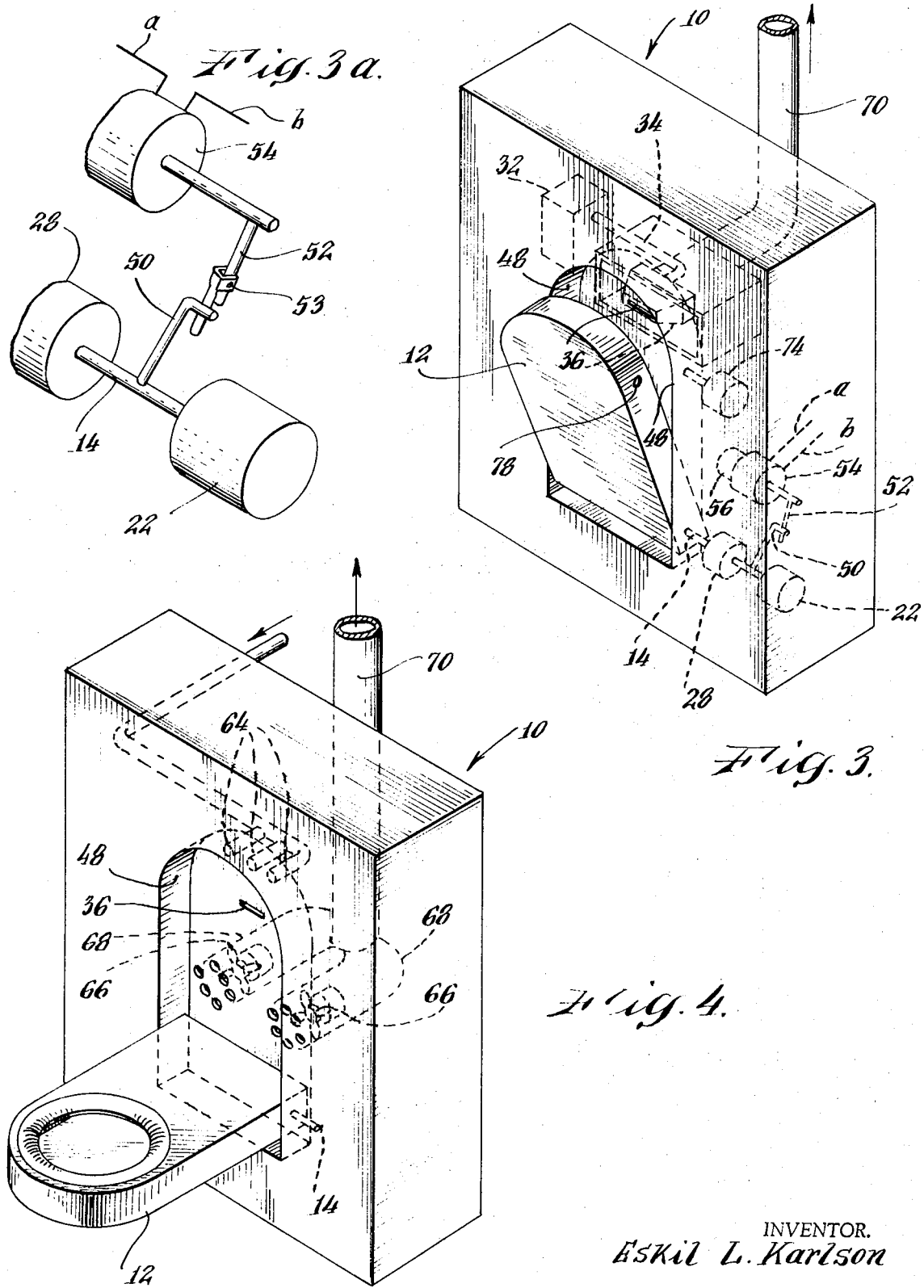

STERILIZING WITH LIQUID SPRAY CONTAINING OZONE

This invention relates to method and apparatus for sterilizing an area and objects within the area, using ozone gas.

It is well known that ozone gas, when present in sufficient concentration is very effective in killing bacteria. Recently its effectiveness and simplicity of use have been recognized by a number of minicipalities which, instead of using chlorine, inject ozone into swimming pools where it is absorbed by the water. When used within proper limits, ozone has the advantage of not promoting allergic reaction and not inflaming the throat and nasal passages of people using the pools as is often the case when chlorine and bromine are used.

For sterilizing medical and dental instruments it has long been customary to place them in boiling water or within a closure which is filled with steam. It takes a substantial amount of time to ready such equipment by raising the temperature of the water whereas ozone may be supplied instantly. Furthermore all bacteria are not destroyed at the temperature of boiling water or even at the temperature of superheated steam. Exposure to ozone in a concentration of 10 or more parts per million for one minute is more effective. Experiments have shown that concentrations in the region of 100 parts per million for 1 – 5 minutes can cause 99 to 100 percent destruction of Escherichia coli and staphylococcus. In some instances sterilization has been attempted by directing ultraviolet light against a surface to be treated. For example, apparatus has been provided for treating toilet seats in this way. This procedure is unsatisfactory for although ultraviolet rays produce some ozone the rays projected against a surface do not produce enough ozone to be effective. Such treatment also fails to reach the under side of a surface.

By the method and means disclosed herein the area surfaces and objects to be sterilized are disposed within an enclosure having a movable wall portion. The closing movement of the wall portion produces simultaneously a supply of water and ozone gas, which in turn provides an ozone carried mist. This mist is directed into the enclosure. The rate at which the water and air are supplied, is controlled in relation to a period of time as for example 1 minute. The movement of the wall portion is employed also to actuate a preset timer in accordance with the ozone supply, the timer also actuating an exhaust fan for removing ozone from the enclosure and for drying the interior of the closure and objects therein.

The invention will be best understood by reading the following description in connection with the drawings in which;

FIG. 1 is a schematic view showing an embodiment of the invention in which ozone gas is discharged from a nozzle over a tube communicating with a supply of water causing water to be drawn through the tube by suction and mixed with the ozone gas in a fine spray which is directed into an enclosure through a suitable port in the closure wall.

FIG. 2 is a schematic view of an electric circuit in which a main switch is responsive to the closing movement of a wall portion of an enclosure and actuates lock means to lock the wall portion in closed position, and the arm of a double throw switch is closed in first actuate an ozonator so that a controlled volume of air directed into the ozonator is converted into ozone gas and mixed with a controlled volume of water to form a spray, and to also actuate, after a time interval, means for drying the wetted surfaces within the closure and for exhausting ozone from the enclosure.

FIG. 3 is an isometric view, of an enclosure with a partly open wall portion mounted to rotate with a pivot rod for movement between open and closed positions, and of means mounted on a lateral extension of the pivot rod for actuating operating means such for example as the means shown in FIGS. 1 and 2.

FIG. 3a is an enlarged view of a portion of FIG. 3, and FIG. 4 is a view similar to FIG. 3 but showing the movable wall portion in a fully open position, disclosing, exhaust passages extending through a wall of the enclosure through which ozone may be withdrawn from the space within the enclosure, and a port through which drying air may be introduced into the space.

In the embodiment of the invention shown in FIG. 1 numeral 10 indicates an enclosure having a movable portion 12 mounted on a rotatable pivot rod indicated by the numeral 14. The numeral 16 indicates a pressure exchanger having therein an expandable bag 18 into which water may be supplied through tube 20 and check valve 21, and the double valve 22 which as shown is operable by arm 23 responsive to rotation of the pivot rod 14, and conduit 24 leading from valve 22 to the bag. Bag 18 is surrounded by air which is supplied into the pressure exchanger 16 through the one way atmospheric valve 26, and is expelled from the pressure chamber as bag 18 is filled with water, and travels through conduit 30 and through ozonator 32 if two position air valve 28 has been opened by rotation of arm 29 which is responsive to rotation of pivot rod 14.

When ozonator 32 has been electrically actuated, as for example by the means shown in FIG. 2, air supplied into the ozonator is discharged from the ozonator in the form of ozone gas, through conduit 34 leading to the nozzle 36 which is disposed directly above the tube 38 the other end of which extends into a water container 40 which is supplied with water through conduit 42 when valve 22 is moved 90° counterclockwise from its position as shown in FIG. 1. The container 40 is desiably disposed within a larger receptacle 44 which is connected to a drain pipe 46.

In a stationary wall portion of closure 10 a port 48 is provided and nozzle 36 is aligned with port 48 so that ozone gas entrained in a water spary will pass from the nozzle into the closure. Ozone may of course be supplied to nozzle 36 from any source of supply. Air expelled from the pressure exchanger 16 and passing to the ozonator 32 will not be converted to ozone until the ozonator is electrically actuated to provide discharges between oppositely charged surfaces which are spaced apart to permit air flow between them.

When ozone gas is mixed with a water spray in a ratio of 100 parts of ozone per million it requires less than 1 minute to sterilize the inner walls of the closure and the surfaces of objects within the closure. As stated above 100 parts per million is an overkill amount and 10 or more parts per million are effective.

The size of pressure exchanger 16 and of bag 18 may be used to control the volume of water in bag 18 and the volume of air in the pressure exchanger and thereby control the duration of the flow of water and air from these sources. After the area defined within the closure and the surfaces of the objects therein have been thoroughly wetted by the ozone carrying liquid spray, thus accomplishing the sterilization, it is desirable to expel the ozone, which when used in concentration of 100 parts per million has a distinct odor, and to dry the surfaces within the closure. Means for accomplishing these steps are shown in FIGS. 2, 3 and 4.

Referring to FIGS. 3 and 4 it will be seen that the movable wall portion 12 is illustrated in the form of a toilet seat which is foldable within a wall 48 of the closure on rotatable pivot rod 14 which is extended laterally and has mounted thereon the two way air valve 28 and the two way water valve 22 and a finger 50 which, as the pivot rod rotates to closed position, contacts an arm 52 projecting from the shaft of a timer 54 the rotation of which closes a switch therein, (shown in FIG. 2 as switch 72) from the terminals of which extend the leads a and b shown in both FIGS. 2 and 3. Closing of this switch also actuates solenoid 74 and rotates cam 56.

Timer 54 is wound up as rod 14 rotates with closing movement of wall portion 12. As soon as wall portion 12 is fully closed switch 72 is closed and the solenoid lock is actuated. The timer runs for a predetermined interval which is the duration of the cycle, turning on air and water flow, the ozone production, and the injection of the ozone with water spray into the enclosure, and the exhausting of the ozone and drying of the wetted surfaces.

When the wall portion 12 is closed and solenoid 74 is actuated the solenoid core 76 is projected through a hole 77 in the inwardly extending flange of the stationary wall 48 (FIG. 3) and into a hole 78 in the side of moveable wall portion 12 thus locking the wall portion in closed position. The ozone is then injected into the enclosure.

When the wall portion becomes fully closed, timer 54 starts to return to its starting position and after a time interval, solenoid 74 is deactivated and core 76 is retracted thus unlocking the wall portion.

Cam 56 has high and low points (FIG. 2) disposed so that the switch arm 58 (FIG. 2) is actuated between the contacts of a double throw switch 60 to alternatively energize the ozonator 32, or the heating coil 62 for heating air supplied into the enclosure through port 64, and fans 66 which are shown (FIG. 4) disposed in horizontal conduits 68 leading to verticle discharge conduit 70 for exhausting the ozone from the closure.

If it is not practical to extend the exhaust conduit outside of a room in which a sterilizer is used, the ozone may be reduced to oxygen and discharged into the room by using a hot platinum or silver wire within the exhaust conduit. The hot platinum or silver wire acts as a catalyst to speed the reduction of the ozone to oxygen.

As shown in FIG. 3a arm 52 is hinged at 53 so that arm 52 is rigid when contacted by finger 50 to actuate the timer 54, but will yield as the timer returns to starting position thus enabling finger 50 to return to starting position.

By the method and apparatus described herein, the objects of the invention may be accomplished in a thoroughly practical way.

What I claim is:

1. Apparatus for sterilizing a first enclosure having a wall portion mounted on a pivot rod for movement with the rod between open and closed positions, which comprises: a timer rotatable in response to closing and opening movements of the wall portion; means responsive to rotation of the timer to actuate, in timed relation, means for locking the movable wall portion in closed position; means for supplying and mixing controlled amounts of ozone and of water to form a mist and inject it into the enclosure; means to exhaust the ozone from the first enclosure and dry the surfaces therein; a port in a wall of said first enclosure; an ozonator; a pressure exchanger comprising a second enclosure having an expandable bag disposed therein, means for supplying a controlled amount of water into the expandable bag, means for supplying a controlled amount of air into the pressure exchanger around the bag, conduit means interconnecting the pressure chamber and the ozonator, and means responsive to closing movement of the said rod for controlling the flow of water into said bag and the flow of air from the pressure exchanger into the said ozonator; a water vessel disposed adjacent the said port; and a tube leading from the ozonator to a point above the water vessel for discharging ozone over the water vessel and entraining water vapor and directing the mixture of ozone and water vapor into the enclosure through said port.

* * * * *